United States Patent [19]

Sakowski et al.

[11] 4,367,209

[45] Jan. 4, 1983

[54] CALCIUM HYPOCHLORITE PRODUCTION FROM ITS DIBASIC SALT

[75] Inventors: Walter J. Sakowski, Cleveland; Budd L. Duncan, Athens, both of Tenn.

[73] Assignee: Olin Corporation, New Haven, Conn.

[21] Appl. No.: 352,747

[22] Filed: Feb. 26, 1982

[51] Int. Cl.³ ............................................. C01B 11/06
[52] U.S. Cl. ..................................................... 423/474
[58] Field of Search ........................................ 423/474

[56] References Cited

U.S. PATENT DOCUMENTS

| | | | |
|---|---|---|---|
| 1,713,669 | 5/1929 | MacMullin et al. | 423/474 |
| 1,718,285 | 6/1929 | George | 423/474 |
| 1,937,230 | 11/1933 | Kitchen | 423/474 |
| 2,320,635 | 6/1943 | Mericola | 423/474 |
| 3,094,380 | 6/1963 | Bruce | 423/474 |
| 3,760,064 | 9/1973 | Droste | 423/474 |
| 3,895,099 | 7/1975 | Sakowski | 423/474 |
| 4,196,184 | 4/1980 | Sakowski | 423/639 |

FOREIGN PATENT DOCUMENTS 55-121901  9/1980  Japan .................................. 423/474

Primary Examiner—Brian E. Hearn
Attorney, Agent, or Firm—James B. Haglind; Donald F. Clements

[57] ABSTRACT

A process for producing neutral calcium hypochlorite which comprises reacting an aqueous slurry of lime containing insoluble impurities with chlorine to form a first slurry of dibasic calcium hypochlorite crystals and insoluble impurities. The insoluble impurities are separated from the first slurry by employing separation means for classifying solids with respect to particle size. Dibasic calcium hypochlorite crystals are then separated and admixed with an alkali metal hypochlorite and recycle dibasic calcium hypochlorite crystals to form a mixing zone slurry. This slurry is reacted with chlorine to form a paste of neutral calcium hypochlorite. The paste is separated into a cake of neutral calcium hypochlorite and a paste liquor and the cake of neutral calcium hypochlorite recovered. The paste liquor is reacted with lime to form a second slurry of dibasic calcium hypochlorite crystals which are separated from their mother liquor and returned to the mixing zone as recycle dibasic calcium hypochlorite.

The novel process can employ low quality lime as it effectively removes insoluble impurities. The process also efficiently recovers calcium and hypochlorite values from process streams.

9 Claims, 2 Drawing Figures

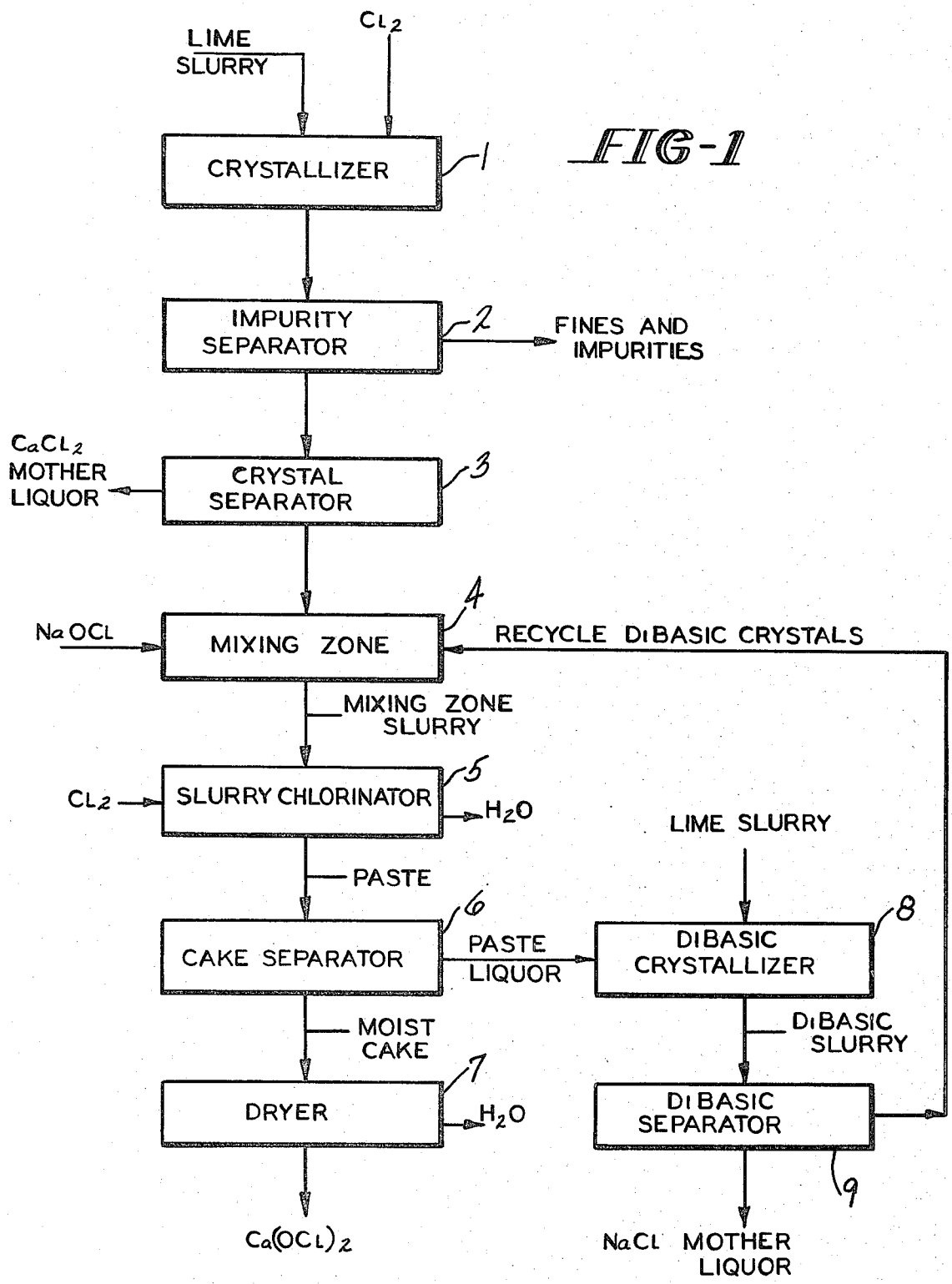

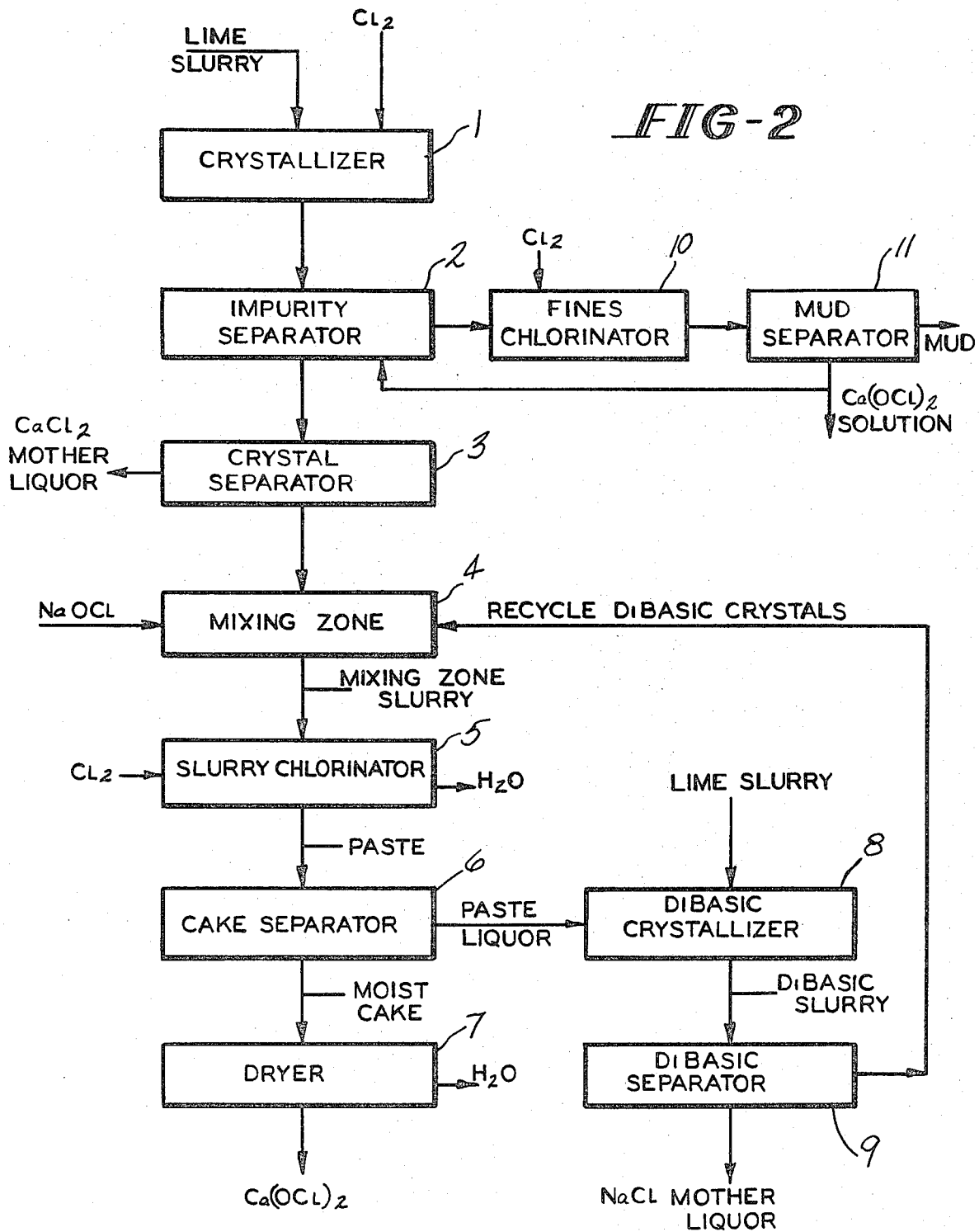

CALCIUM HYPOCHLORITE PRODUCTION FROM ITS DIBASIC SALT

This invention relates to the manufacture of calcium hypochlorite. More particularly, this invention relates to an improved continuous process for the manufacture of calcium hypochlorite. Calcium hypochlorite is a commercial bleaching and sanitizing agent used particularly in the disinfection of swimming pools.

Calcium hypochlorite is commercially produced by the reaction of an aqueous slurry of lime with chlorinating agent such as chlorine. The lime employed is of a high purity as impurities normally found in lime are deleterious to the calcium hypochlorite product when present in any significant amounts. There are, however, relatively few natural sources of lime which meet the specifications required by commercial calcium hypochlorite processes. Further, these high purity limes, where available, bring a premium price and thus increase the cost of producing calcium hypochlorite. In addition, there are produced in commercial processes solutions containing concentrations of calcium hypochlorite which are too dilute for recycle to the process and too concentrated for disposal by environmentally safe procedures.

The treatment of calcium hypochlorite containing mother liquors with lime to precipitate dibasic calcium hypochlorite crystals is known as described, for example, in U.S. Pat. Nos. 1,713,669; 1,718,285; and 3,094,380.

U.S. Pat. No. 1,713,669, issued to R. B. MacMullin et al, describes a process in which a lime slurry is chlorinated to precipitate calcium hypochlorite which is separated from a filtrate containing hypochlorite values. The filtrate is treated with lime to precipitate basic calcium hypochlorite which is recycled to make up additional lime slurry.

U.S. Pat. No. 1,718,285, issued to A. George, teaches a process for reacting a sodium hypochlorite solution and lime to produce a neutral calcium hypochlorite crystals in a mother liquor. Following the separation of the crystalline product, the mother liquor may be treated with lime to form a basic hypochlorite which can be used to replace an equivalent amount of lime in the next cycle of the process.

Similarly, U.S. Pat. No. 3,094,380, issued to E. A. Bruce, describes the reaction of calcium hypochlorite mother liquor with lime to crystallize dibasic calcium hypochlorite. A cake of dibasic calcium hypochlorite was recovered and chlorinated to produce neutral calcium hypochlorite.

The processes of U.S. Pat. Nos. 1,713,669; 1,718,285; and 3,094,380 cannot use low grade lime sources as the calcium hypochlorite products produced contain any insoluble impurities originally present in the lime.

The removal of iron from slurries of basic calcium hypochlorite crystals is described in U.S. Pat. No. 3,760,064, issued Sept. 18, 1973, to T. C. Droste, in a process which adds a salt of a slurry metal of Group IIA, IIB, or silver to the slurry to form an insoluble iron compound. The insoluble iron compound is removed from the basic calcium hypochlorite crystals by employing a settling apparatus which provides a differential rate of settling. However, by converting a soluble iron impurity in the slurry to an insoluble impurity, this process introduces additional solids to be separated from the calcium hypochlorite crystals. In addition, inclusion of the metals employed into the finished calcium hypochlorite product is undesirable.

In U.S. Pat. No. 3,895,099, issued July 15, 1975, to W. J. Sakowski, a process is described in which lower grade lime sources may be employed which are initially reacted with chlorine to form a slurry of the insoluble impurities in a solution of calcium hypochlorite and calcium chloride. The insoluble impurities are removed from the solution, for example, by filtering and the purified filtrate is then employed in producing calcium hypochlorite. U.S. Pat. No. 3,895,099 also teaches the treatment of dilute calcium hypochlorite solutions with an alkali metal hydroxide to recover a highly pure lime.

U.S. Pat. No. 4,196,184, issued Apr. 1, 1980, to W. J. Sakowski, describes a process in which a $Ca(OCl)_2$-containing mother liquor is reacted with an alkali metal hydroxide at a pH in the range of 12.1 to 12.6 to form a mixture of crystalline hemi-basic calcium hypochlorite and lime.

While the processes of U.S. Pat. No. 3,895,099 and U.S. Pat. No. 4,196,184 recover calcium values from calcium hypochlorite-containing liquors; both processes require evaporation of the filtrate remaining after separation of the lime.

Japanese Patent Disclosure No. 121,901-1980 publicly disclosed on Sept. 19, 1980, by T. Murakami et al describe a method of removing insoluble impurities from slurries of calcium hypochlorite dihydrate in a classifier tank. As there is a considerable overlap between the particle size of the insoluble impurities and the calcium hypochlorite dihydrate crystals, efficient separation of the insoluble impurities by particle size classification methods is difficult to achieve.

Thus there is need for a process for producing calcium hypochlorite in which insoluble impurities are readily removed and in which calcium values are economically recovered from waste streams.

It is a primary object of the present invention to provide a continuous process for producing calcium hypochlorite in which low grade lime sources can be employed.

An additional object of the present invention is to provide a process for efficiently and readily removing insoluble impurities from slurries of calcium hypochlorite crystals.

Another object of the invention is to provide an improved process for producing calcium hypochlorite wherein the calcium and hypochlorite values in waste streams are substantially reduced.

A further object of the present invention is to provide a process for recovering calcium and hypochlorite values from effluents containing calcium hypochlorite having reduced energy requirements.

A still further object of the present invention is to provide a process for recovering calcium and hypochlorite values having reduced raw material costs.

These and other objects of the present invention are accomplished in a process for producing neutral calcium hypochlorite which comprises:

(a) reacting an aqueous slurry of lime containing insoluble impurities with chlorine to form a first slurry of dibasic calcium hypochlorite crystals and insoluble impurities in a calcium chloride mother liquor;

(b) separating the insoluble impurities from the first slurry of dibasic calcium hypochlorite crystals in calcium chloride mother liquor;

(c) separating the dibasic calcium hypochlorite crystals from the calcium chloride mother liquor;

(d) admixing the dibasic calcium hypochlorite crystals, an alkali metal hypochlorite and recycle dibasic calcium hypochlorite crystals in a mixing zone to form a mixing zone slurry;

(e) reacting the mixing zone slurry with chlorine to form a paste of neutral calcium hypochlorite;

(f) separating the paste into a cake of neutral calcium hypochlorite and a paste liquor;

(g) reacting the paste liquor with lime to form a second slurry of dibasic calcium hypochlorite crystals in a sodium chloride mother liquor;

(h) separating the dibasic calcium hypochlorite crystals from the sodium chloride mother liquor; and (i) returning the dibasic calcium hypochlorite crystals to the mixing zone as recycle dibasic calcium hypochlorite crystals.

FIG. 1 is a flow sheet of one embodiment of the present invention illustrating lime purification and the recycle of dibasic calcium hypochlorite slurry.

FIG. 2 is a flow sheet showing the embodiment of FIG. 1 as well as steps for recovering calcium values from a slurry of insoluble impurities.

Alkali metal hypochlorites are employed as reactants in the present invention and one of the products is an alkali metal chloride. In order to simplify the disclosure, the invention will be described hereinafter in terms of "sodium hypochlorite", and "sodium chloride". However, those skilled in the art will recognize that any other suitable alkali metal hypochlorite such as potassium hypochlorite can serve as a substitute or partial replacement for the corresponding sodium compounds. In this event, one of the products will be potassium chloride. In order to simplify process conditions, it is preferred to employ either all sodium compounds or all potassium compounds. However, the process can also be operated with a mixture of these alkali metal compounds if the efficiency of separating products is not important to the operation.

More in detail, in the process of FIG. 1, an aqueous slurry of lime is fed to crystallizer 1 and reacted with chlorine to form a slurry of dibasic calcium hypochlorite crystals and insoluble impurities in a calcium chloride mother liquor containing calcium hypochlorite. Crystallizer 1 is any suitable tank crystallizer provided with agitation means. The slurry is removed from crystallizer 1 and added to impurity separator 2. Impurity separator 2 is any suitable solid-liquid separator having means to classify the solids with respect to particle size. Examples of separators which may be employed include elutriators, sedimentation tanks, air flotation apparatus, hydrocyclones and hydraulic classifiers. Impurity separator 2 separates coarse, clean crystals of dibasic calcium hypochlorite from the insoluble impurities present in the lime used, and fine crystals of dibasic calcium hypochlorite. The insoluble impurities and fines are removed from impurity separator 2 for further treatment or disposal.

A slurry of coarse dibasic hypochlorite crystals in calcium chloride mother liquor is recovered from impurity separator 2 and conveyed to crystal separator 3, a solid-liquid separating apparatus such as a filter or centrifuge. In crystal separator 3, the calcium chloride mother liquor is separated from a concentrated slurry or moist cake of dibasic calcium hypochlorite. The calcium chloride mother liquor may be concentrated to produce a hydrate such as the dihydrate, tetrahydrate or hexahydrate of calcium chloride which may be used commercially as heat transfer agents, for example, in solar energy technology.

Coarse dibasic calcium hypochlorite crystals from crystal separator 3, as a moist cake or concentrated slurry in calcium chloride mother liquor are fed to mixing zone 4. Also added to mixing zone 4 are sodium hypochlorite solution and recycle dibasic calcium hypochlorite crystals. These reagents are admixed in mixing zone 4 to form a mixing zone slurry. Mixing zone 4 is a mixing tank or other suitable vessel having agitation means for blending the various components fed thereto.

The resulting mixing zone slurry is conveyed to slurry chlorinator 5 and reacted with chlorine. Slurry chlorinator 5 is any suitable chlorination apparatus provided with agitation means for maximum contact between chlorine and slurry. Although any chlorinator having cooling means for removing the heat of chlorination is suitable, it is preferred to employ as slurry chlorinator 5 an evaporator-chlorinator which utilizes the chlorination technique described in U.S. Pat. No. 3,241,912, issued to Bernard H. Nicolaisen on Mar. 22, 1966. Temperatures within slurry chlorinator 5 are maintained within the range from about 0° to about 35° C. and preferably from about 20° to about 30° C.

During chlorination of the slurry in slurry chlorinator 5, lime reacts with chlorine to form calcium hypochlorite and calcium chloride in accordance with Equation (1):

$$Ca(OH)_2 + Cl_2 \rightarrow \tfrac{1}{2}Ca(OCl)_2 + \tfrac{1}{2}CaCl_2 + H_2O. \quad (1)$$

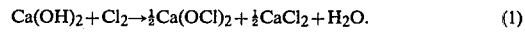

The dibasic calcium hypochlorite present in the slurry chlorinator 5 reacts with chlorine to form calcium hypochlorite and calcium chloride in accordance with Equation (2):

$$Ca(OCl)_2.2Ca(OH)_2 + 2Cl_2 \rightarrow 2Ca(OCl)_2 + CaCl_2 + 2H_2O. \quad (2)$$

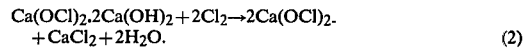

Sodium hypochlorite present in slurry chlorinator 5 reacts with calcium chloride to form additional calcium hypochlorite and sodium chloride in accordance with Equation (3):

$$2NaCl + CaCl_2 \rightarrow Ca(OCl)_2 + 2NaCl. \quad (3)$$

The primary products of slurry chlorinator 5 are neutral calcium hypochlorite dihydrate crystals in a sodium chloride mother liquor. At start-up of the process, it is preferred to fill slurry chlorinator 5 with a slurry of calcium hypochlorite dihydrate solids suspended in an aqueous solution of sodium chloride and calcium hypochlorite. The feed rate of mixing zone slurry and chlorine to slurry chlorinator 5, the rate of evaporation of water, if any, and the withdrawal rate of the resulting calcium hypochlorite paste are adjusted to achieve substantially complete chlorination of the calcium values fed to slurry chlorinator 5 in the mixing zone slurry, while maintaining the total alkali concentration in slurry chlorinator 5 below about 1.0 percent and preferably below about 0.5 percent by weight of the slurry. Continuous chlorination of the slurry in this manner causes the formation of coarse calcium hypochlorite dihydrate crystals which are much more easily separated from paste liquor in cake separator 6 than are calcium hypochlorite dihydrate crystals separated in a conventional triple salt process or a batch type process.

A portion of the resulting paste produced in slurry chlorinator 5 comprised of solid neutral calcium hypochlorite dihydrate and a paste liquor, which is predominately an aqueous solution of sodium chloride and calcium hypochlorite, is continuously withdrawn from slurry chlorinator 5 and conveyed to cake separator 6.

Cake separator 6 is a filter, centrifuge, or other suitable solid-liquid separating apparatus capable of separating a moist cake of calcium hypochlorite dihydrate crystals from the paste liquor.

Moist cake from cake separator 6 generally contains from about 40 to about 60 percent by weight of calcium hypochlorite, from about 2 to about 15 percent by weight of sodium chloride, and from about 30 to about 50 percent by weight of water. Moist cake is generally conveyed to dryer 7 where it is heated to remove most of the water. Dryer 7 is any suitable drying unit or units capable of reducing the moisture content of the calcium hypochlorite cake to the desired level without causing excess decomposition of the calcium hypochlorite particles.

Generally the water content of the calcium hypochlorite cake is reduced in dryer 7 to below about 10 percent by weight, for example, in the range from about 0.5 to about 10, perferably from about 0.5 to about 8, and more particularly from about 4.0 to about 8 percent by weight. The calcium hypochlorite content of the dried product generally ranges from about 65 to about 85, and preferably from about 65 to about 75 percent by weight. The remainder of the dried product is predominantly sodium chloride. The dried calcium hypochlorite product is then placed in suitable containers, with or without prior size classification or other processing such as pelletizing, prior to use in water treatment or other utility.

"Paste liquor" (or "paste filtrate" when cake separator 6 is a filter) is an aqueous sodium chloride solution from cake separator 6 which also contains soluble calcium hypochloride. This paste liquor is conveyed to dibasic crystallizer 8, which is any suitable tank crystallizer provided with agitation means, where the added lime reacts with calcium hypochlorite present in the paste liquor in accordance with Equation (4):

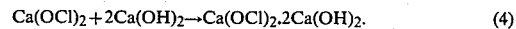

$$Ca(OCl)_2 + 2Ca(OH)_2 \rightarrow Ca(OCl)_2 \cdot 2Ca(OH)_2. \quad (4)$$

This reaction in dibasic crystallizer 8 forms a slurry of dibasic calcium hypochlorite crystals in a NaCl mother liquor, an aqueous solution of sodium chloride and calcium hypochlorite. The resulting slurry is conveyed to dibasic separator 9 which is a solid-liquid separating apparatus such as filter, centrifuge, or other suitable apparatus. In dibasic separator 9, at least a portion of the mother liquor is separated from the dibasic slurry to form a more concentrated slurry or a moist dibasic cake which is recycled to mixing zone 4.

Sodium chloride mother liquor, the aqueous solution of sodium chloride and calcium hypochlorite recovered in dibasic separator 9, may be utilized as bleach liquor. This mother liquor contains minor amounts of calcium hypochlorite values, for example, from about 2 to about 6 weight percent of $Ca(OCl)_2$. A portion of the NaCl mother liquor from dibasic separator 9 is preferably recycled to the process as described more fully below.

In the embodiment of FIG. 2, which is similar to FIG. 1 except that fine crystals and lime impurities are conveyed from impurity separator 2 to fines chlorinator 10. Chlorine is fed to fines chlorinator 10 to chlorinate dibasic calcium hypochlorite fines and residual lime present in the impurities-containing slurry to produce a slurry of insoluble impurities in a solution of calcium hypochlorite and calcium chloride. Fines chlorinator 10 is any reactor in which a chlorination reaction can be conducted.

From fines chlorinator 10, the slurry of insoluble impurities is conveyed to mud separator 11 which is any suitable solid-liquid separator such as a centrifuge or filter. The insoluble impurities are separated as a mud or slime and disposed of, for example, in land fill deposits. The solution containing calcium hypochlorite and calcium chloride values recovered in mud separator 11 is transported to crystal separator 3. In an added embodiment, a portion of the solution from mud separator 11 may be used as the aqueous phase in preparing the lime slurry fed to crystallizer 1.

The primary raw materials for the process of this invention are lime, sodium hypochlorite, chlorine and water.

Lime is added to the process at crystallizer 1 and dibasic crystallizer 8 as an aqueous slurry. One of the advantages of this invention is that relatively impure lime may be utilized to prepare a relatively pure calcium hypochlorite product. For example, lime having an active lime content as low as 85 percent by weight or less may be added to crystallizer 1 or dibasic crystallizer 8 in accordance with the process of this invention and produce a relatively pure calcium hypochlorite product. Generally the active lime content of the lime employed in the process of the present invention ranges from about 85 to about 100 percent, and preferably from about 90 to about 97 percent by weight of active lime. Lime impurities may range from about 0 to about 15 percent and generally from about 3 to about 10 percent by weight of the lime.

Typical illustrative specifications for a preferred lime feed and for an acceptable lime feed are as follows:

| Component | Preferred | Acceptable |
| --- | --- | --- |
| $Ca(OH)_2$ min. % | 95.0 | 85 |
| $CaCO_3$ max. % | 1.0 | 3.0 |
| MgO max. % | 0.5 | 3.5 |
| $SiO_2$ max. % | 0.5 | 2.5 |
| $Fe_2O_3 + Al_2O_3$ max. % | 0.5 | 1.5 |
| $CaSO_4$ max. % | 0.5 | 1.5 |

The average particle size of lime feed to the process generally is substantially all −325 mesh (wet screen analysis), but particles up to about −200 mesh may be employed, if desired.

As previously shown above, impurities in the lime include insoluble impurities such as silica, aluminum salts, iron salts, magnesium salts, magnesia, unburned limestone (calcium carbonate and magnesium carbonate) and other compounds in trace quantities. These impurities present in the lime slurry fed to crystallizer 1 remain insoluble and form a slurry with the dibasic calcium hypochlorite crystals in an aqueous solution of calcium hypochlorite and calcium chloride. This slurry is conveyed to impurity separator 2, which is a suitable solid-liquid separator having means to classify the solids with respect to particle size. Solid impurities from impurity separator 2 are generally disposed of as solid waste, land fill or the like.

Sodium hypochlorite, added to mixing zone 4, may be prepared by chlorinating an aqueous solution of sodium hydroxide in a suitable agitated chlorinator reactor (not shown). The sodium hydroxide concentration in the aqueous solution used to make sodium hypochlorite ranges from about 20 to about 75 and preferably from about 35 to about 55 percent by weight.

Chlorine is added to crystallizer 1, slurry chlorinator 5, as well as fines chlorinator 10 in either gaseous or liquid form. The chlorination reactions are carried out in any suitable chlorinator such as those described above.

In the process of the present invention, lime and chlorine are reacted in crystallizer 1 to produce dibasic calcium hypochlorite crystals. To form crystals having a size range which permits suitable separation rates in crystal separator 3, an aqueous slurry containing from about 15 to about 40 percent by weight of lime, and chlorine are fed to crystallizer 1. The reagents are added at rates which maintain an oxidation-reduction potential of the reaction mixture in the range of from about 690 to about 710, and preferably from about 695 to about 705 millivolts. Temperatures of the reaction mixture are kept in the range of from about 30° to about 50° C. and preferably from about 40° to about 45° C. The reaction mixture is chlorinated to provide a total alkalinity of from about 18 to about 22 and preferably from about 19 to about 21 percent. Under these reaction conditions, hexagonal crystals of dibasic calcium hypochlorite are formed having sizes in the range of from about 20 to about 1200, preferably from about 100 to about 1000, and more preferably from about 500 to about 700 microns. In addition to dibasic calcium hypochlorite crystals, the slurry formed contains insoluble impurities found in the lime used as discussed above. The solution phase of the slurry is an aqueous solution of calcium chloride containing soluble calcium hypochlorite. The slurry from crystallizer 1, having a solids content in the range of from about 15 to about 30 percent, is conveyed to impurity separator 2.

Impurity separator 2 is any suitable wet classifier capable of separating the small particulate insoluble impurities and fine crystals of dibasic calcium hypochlorite, i.e., those smaller than about 40 microns, from the coarse hexagonal crystals of dibasic calcium hypochlorite. Preferred as impurity separators are elutriators which can remove over 90 percent of the insoluble impurities and fine crystals. From impurity separator, 2 a slurry is recovered containing high purity dibasic calcium hypochlorite crystals in an aqueous solution of calcium chloride and calcium hypochlorite. This slurry is conveyed to a crystal separator such as a centrifuge or filter which separates a moist cake or concentrated slurry of dibasic calcium hypochlorite crystals from a calcium chloride mother liquor containing from about 15 to about 30 weight percent of $CaCl_2$ and dissolved calcium hypochlorite. As discussed above, the calcium chloride mother liquor may be used in the production of calcium chloride hydrates. Where the embodiment of FIG. 2 is employed, part or all of the calcium chloride solution from mud separator 11 is transported to impurity separator 2. In an added embodiment, a portion of the solution from mud separator 11 may be used as the aqueous phase in preparing the lime slurry fed to crystallizer 1.

Dibasic calcium hypochlorite slurry added to mixing zone 4 from crystal separator 3 has a lime concentration of from about 18 to about 28 weight percent and a calcium hypochlorite concentration of from about 16 to about 25 percent by weight.

To mixing zone 4, a sodium hypochlorite solution is fed along with the dibasic calcium hypochlorite slurry produced in crystal separator 3 and the recycle dibasic calcium hypochlorite slurry from dibasic separator 9. Sufficient amounts of sodium hypochlorite are used to provide the reaction mixture with at least 2 moles of NaOCl per mole of $Ca(OCl)_2 \cdot 2Ca(OH)_2$. Sodium hypochlorite reacts with the calcium chloride present and that formed during the chlorination of dibasic calcium hypochlorite. The reaction produces calcium hypochlorite and sodium chloride in accordance with the reaction expressed by Equation (3).

The ultimate water content in the mixing zone slurry is carefully controlled by adjusting the water content of the various feed streams to mixing zone 4 or by the addition of water directly to mixing zone 4. For example, the water content of the dibasic calcium hypochlorite slurry from crystal separator 3, the water content of the sodium hypochlorite solution and the water content of recycled dibasic calcium hypochlorite slurry from dibasic separator 9 are controlled to obtain a mixing zone slurry of the desired concentration range described above.

Paste from slurry chlorinator 5 is predominately a slurry of neutral calcium hypochlorite in an aqueous solution of sodium chloride and calcium hypochlorite. The paste contains neutral calcium hypochlorite dihydrate crystals in a concentration of from about 10 to about 35 and preferably from about 15 to about 30 percent by weight. These crystals are predominately rectangular platelets which are only a few microns in thickness, but have substantially equal sides ranging from about 50 to about 300 microns in length with the major portion having sides ranging from about 100 microns to about 250 microns in length. Generally, less than about 10 percent of the crystals are "twin crystals" which entrain paste liquor, which are difficult to separate from the paste liquor, and which are difficult to dry. Since more than about 90 percent of the calcium hypochlorite dihyrate crystals obtained by the process of this invention may be large platelets or cohesive agglomerates, there is a minimal amount of paste liquor entrained in the crystals during the separation in cake separator 6, where, for example, cake separator 6 is a drum filter. The crystals are easier to separate from the paste liquor in cake separator 6 and are easier to dry in dryer 7 than crystals produced by conventional calcium hypochlorite techniques. In prior art techniques, more expensive high speed titanium centrifuges are necessary to obtain crystals of equivalent purity.

Moist cake from cake separator 6 contains from about 40 to about 60 percent by weight of $Ca(OCl)_2$, from about 2 to about 15 percent by weight of NaCl, and from about 30 to about 50 percent by weight of water. This moist cake may be used directly in the treatment of water systems such as swimming pools and the like, but is generally dried and stored prior to use. The moist cake is dried by known means, for example, using a spray dryer, rotary dryer, turbodryer or vacuum dryer where the appropriate temperature ranges are employed to reduce the water content to the desired level. In the process of the present invention, the cake is dried, for example, in a turbodryer with hot air while maintaining the product temperature in the range from about 35° to about 110° C., and preferably from about 40° to about 95° C. to give a product having a calcium hypochlorite content from about 65 to about 85, a water content below about 10 percent by weight and the bulk of the remainder being sodium chloride.

Paste liquor from cake separator 6 generally has a sodium chloride concentration ranging from about 15 to about 22 percent, and preferably from about 17 to about 20 percent by weight, a calcium hypochlorite concentration ranging from about 7 to about 15 percent and preferably from about 8 to about 12 percent by weight, and a water content ranging from about 60 to about 75 percent and preferably from about 68 to about 73 percent by weight.

In one embodiment of the process of the present invention, a portion of the paste liquor may be recycled to mixing zone 4, if desired, to improve control of the chlorination and heat transfer in slurry chlorinator 5. Generally, from 0 to about 40 and preferably from about 0 to about 10 percent by weight of the paste liquor is recycled to mixing zone 4, the balance being conveyed to dibasic crystallizer 8.

As discussed above, paste liquor is reacted with a lime slurry in dibasic crystallizer 8 to produce dibasic calcium hypochlorite crystals. To produce crystals having improved filterability while recovering substantial amounts of the calcium hypochlorite values in the paste filtrate, the reaction in dibasic crystallizer 8 is carefully controlled with respect to the concentration of available chlorine and the total alkalinity.

To maintain the desired available chlorine concentration, dibasic crystallizer 8 is operated to maintain the oxidation-reduction potential of the dibasic calcium hypochlorite slurry in the range of from about 690 to about 705 millivolts. Where the oxidation-reduction potential of the reaction mixture is above about 705 millivolts, the calcium hypochlorite concentration of the mother liquor recovered from dibasic separator 9 is undesirably high.

Total alkalinity of the reaction mixture of paste liquor and lime slurry within dibasic crystallizer 8 is maintained within the range of from about 2 to about 6, and preferably from about 3 to about 4 percent. Total alkalinity of the reaction mixture is provided by the dibasic calcium hypochlorite crystals, hemibasic calcium hypochlorite crystals, free lime and basic impurities present such as calcium oxide, calcium carbonate, magnesium carbonate and magnesium oxide. Where the total alkalinity is above about 6 percent, the presence of excessive amounts of free lime reduces the separation rate of the slurry in dibasic separator 9. Reduction of the total alkalinity below about 2 percent results in the formation of crystals of hemibasic calcium hypochlorite and an undesirably high concentration of available chlorine in the mother liquor recovered from dibasic separator 9.

The temperature of the reaction mixture of paste liquor and lime in dibasic crystallizer 8 is maintained within the range of from about 30° to about 50° C., preferably at from about 38° to about 45° C., and more preferably at from about 40° to about 42° C. Operating the dibasic crystallizer within these temperature ranges results in the growth of dibasic calcium hypochlorite crystals which are readily filtered, are stable, and where "fines" are minimized. When temperatures below about 30° C. are employed in the dibasic crystallizer, the crystals grown are very fine and result in low separation rates in dibasic separator 9. At temperatures above about 42° C., the crystals are readily filtered, but the rate of decomposition increases resulting in the formation of excessive amounts of calcium chlorates. The slurry, dibasic calcium hypochlorite, produced in dibasic crystallizer 8 has a solids content in the range of from about 5 to about 20 percent, and preferably from about 10 to about 15 percent.

The slurry of dibasic calcium hypochlorite crystals from dibasic crystallizer 8 is fed to dibasic separator 9 where dibasic calcium hypochlorite crystals are separated from a dibasic mother liquor. Dibasic separator 9 is a filter, centrifuge, or any other suitable solid-liquid separating device capable of separating a slurry or moist cake of dibasic calcium hypochlorite crystals from a sodium chloride mother liquor, an aqueous solution of sodium chloride and calcium hypochlorite. The dibasic calcium hypochlorite crystals are preferably separated as a thickened slurry in the mother liquor containing from about 45 to about 65 percent solids. As stated above, this thickened slurry is recycled to mixing zone 4; a portion may also be used to prepare the lime slurry fed to dibasic crystallizer 8. Similarly, a portion of the sodium chloride mother liquor may be used in preparing the lime slurry fed to dibasic crystallizer 8.

In one embodiment, prior to feeding the slurry of dibasic calcium hypochlorite crystals from dibasic crystallizer 8 to dibasic separator 9, all or a portion of the slurry is passed through an impurity separator such as an elutriator to remove insoluble impurities and fine crystals of dibasic calcium hypochlorite present in the slurry. These fine crystals and insoluble impurities may be conveyed to a fines chlorinator and mud separator as previously discussed.

Sodium chloride mother liquor recovered from dibasic separator 9 is an aqueous solution containing sodium chloride and small amounts of dissolved calcium hypochlorite, i.e., from about 2 to about 6 percent by weight of $Ca(OCl)_2$. This mother liquor may be used as the aqueous solution in forming the lime slurry fed to dibasic crystallizer 8. Sodium chloride mother liquor may also be treated with sodium hydroxide to recover the remaining hypochlorite values as sodium hypochlorite and the calcium values as lime. The lime produced is highly active and contains above 95 percent $Ca(OH)_2$. The dilute slurry of lime produced by the reaction of sodium hydroxide with sodium chloride mother liquor is fed to a separator to separate a lime slurry from a sodium chloride and sodium hypochlorite solution. The lime slurry may be recycled to crystallizer 1 and/or dibasic crystallizer 8. The sodium chloride and sodium hypochlorite solution recovered may be recycled as the solution in forming lime slurries used in the process. Where possible, the sodium chloride solution, essentially free of calcium hypochlorite and calcium hydroxide, can be fed as brine to electrolytic cells for the production of chlorine and alkali metal hydroxides. The salt solution may also be discarded, without further treatment, to water bodies without resulting in undesired pollution.

The novel process of the present invention may be operated continuously or batchwise, but is preferably carried out on a continuous basis which permits higher rates of chlorination and thus increased rates of production. Continuous chlorination also produces calcium hypochlorite dihyrate crystals which are more easily separated by the solid-liquid method of separation employed and which are easier to dry. Calcium hypochlorite values are efficiently recovered from process liquors in the process of the present invention while reducing energy costs and minimizing the calcium hypochlorite values in treated effluents. The process of the present invention further provides highly pure dibasic calcium hypochlorite crystals for reuse in a neutral calcium hypochlorite process by optimizing crystal growth conditions and effectively removing insoluble impurities. Raw material costs are substantially reduced as the high purity lime required for most conventional commercial calcium hypochlorite processes need not be used and lime from virtually any source can be employed. Of the total amount of lime employed in the novel process of the present invention, from about 70 to about 90 and preferably from about 75 to about 85 percent by weight is added at crystallizer 1. The remaining lime, from about 10 to about 30 and preferably from about 15 to about 25 percent by weight is added at dibasic crystallizer 8.

The following EXAMPLE is presented to illustrate the invention more fully. All parts and percentages are by weight unless otherwise specified.

EXAMPLE

An aqueous slurry of lime (active content 95%) containing about 25 percent solids was prepared. The lime slurry was conveyed to a reactor equipped with an agitator. Chlorine gas was fed to the reactor and the lime slurry chlorinated at ambient temperature until the total alkalinity of the slurry was about 0.3 percent. The chlorinated lime slurry was filtered and a clarified solution of calcium chloride and calcium hypochlorite recovered as the filtrate. The filtrate (2400 parts) was mixed in a reactor with 400 parts of water, 8 parts of lime and 540 parts of calcium chloride. To 1540 parts of this mixture of calcium hypochlorite, lime and calcium chloride was added 2000 parts of a lime slurry having 35 percent by weight of $Ca(OH)_2$. This mixture and chlorine gas was continuously fed to a separate reactor which was maintained by cooling at a temperature of 44° C. and dibasic calcium hypochlorite crystals were produced as a slurry in a calcium chloride and calcium hypochlorite solution. The dibasic slurry was analyzed and found to contain 9.99 percent $Ca(OCl)_2$, 9.09 percent $Ca(OH)_2$, 16.21 percent $CaCl_2$ and 64.71 percent $H_2O$. The dibasic slurry was fed to the upper part of an elutriator at a rate of 45 parts per minute. The elutriant, initially an aqueous solution of calcium chloride, was fed to the lower part of the elutriator at a rate of 104 parts per minute. Recovered as the underflow at a rate of 30 parts per minute was a thickened, purified slurry of dibasic calcium hypochlorite. Insoluble inert materials were removed from the elutriator as the overflow and filtered. The clear filtrate recovered was recycled to the elutriator as the elutriant. Insoluble impurities removed from the filter were disposed of as solid wastes. The dibasic slurry was filtered on a vacuum filter to separate a wet cake of dibasic calcium hypochlorite crystals from a dibasic mother liquor. The composition of the wet cake was determined to be 23.55 percent $Ca(OCl)_2$, 26.33 percent $Ca(OH)_2$, 11.56 percent $CaCl_2$ and 38.55 percent $H_2O$. The dibasic mother liquor contained 2.90 percent $Ca(OCl)_2$, 0.08 percent $Ca(OH)_2$, 17.29 percent $CaCl_2$ and 79.72 percent $H_2O$. 260 Parts of a typical wet cake of dibasic calcium hypochlorite crystals were fed to a mixing tank to which also was added 323 parts of a nominal 32 percent sodium hypochlorite solution and 100 parts of water. In the mixing tank, the mixture was blended to form a mixing zone slurry of dibasic calcium hypochlorite crystals in a solution of calcium hypochlorite, sodium hypochlorite and sodium chloride. The slurry was fed continuously to a cooled chlorinating vessel equipped with an agitator. Chlorine gas (65 parts) was continuously fed to the chlorinator and 748 parts of a neutral calcium hypochlorite paste were produced. The feed rate of the chlorine gas and mixing zone slurry to the chlorinator were adjusted to produce a paste having a total alkalinity of 0.5 percent.

The neutral calcium hypochlorite paste was conveyed to a filter which separated the paste into a moist cake of neutral calcium hypochlorite dihydrate and paste liquor. Moist cake containing 45.2 percent $Ca(OCl)_2$, 8.7 percent NaCl and 43 percent $H_2O$ on the filter was transferred to a dryer. A dried neutral calcium hypochlorite product was recovered from the dryer containing 73.8 percent $Ca(OCl)_2$, 13.3 percent NaCl and 6.2 percent $H_2O$.

Paste liquor, an aqueous solution of calcium hypochlorite and sodium chloride was fed to a tank, a jacketed crystallizer equipped with an agitator. The tank had an external recycle loop containing a temperature sensing element and an oxidation-reduction potential sensor. Lime (16 parts) was slurried in 56 parts of water containing 28 parts of sodium chloride. Addition of paste liquor and lime slurry were controlled to maintain the oxidation-reduction potential of the reaction mixture at a range of 690 to about 705 millivolts. Heating fluid circulating through the jacket maintained the temperature in the crystallizer at about 40° C. A slurry of dibasic calcium hypochlorite crystals was produced in the crystallizer. The slurry was fed to a filter which separated a moist cake of dibasic calcium hypochlorite crystals (48 parts) from a mother liquor containing 23 percent NaCl, 3 percent $Ca(OCl)_2$ and having 0.1 percent total alkalinity. The moist cake of dibasic calcium hypochlorite crystals was recycled to the mixing tank for use in a subsequent batch.

What is claimed is:

1. A process for producing neutral calcium hypochlorite which comprises:
   (a) reacting an aqueous slurry of lime containing insoluble impurities with chlorine to form a first slurry of dibasic calcium hypochlorite crystals and insoluble impurities in a calcium chloride mother liquor;
   (b) separating said insoluble impurities from said first slurry of dibasic calcium hypochlorite crystals in said calcium chloride solution;
   (c) separating said dibasic calcium hypochlorite crystals from said calcium chloride mother liquor;
   (d) admixing said dibasic calcium hypochlorite crystals, an alkali metal hypochlorite and recycle dibasic calcium hypochlorite crystals in a mixing zone to form a mixing zone slurry;
   (e) reacting said mixing zone slurry with chlorine to form a paste of neutral calcium hypochlorite;
   (f) separating said paste into a cake of neutral calcium hypochlorite and a paste liquor;
   (g) reacting said paste liquor with lime to form a second slurry of dibasic calcium hypochlorite crystals in a mother liquor;
   (h) separating said dibasic calcium hypochlorite crystals from dibasic mother liquor; and
   (i) returning said dibasic calcium hypochlorite crystals to said mixing zone as recycle dibasic calcium hypochlorite.

2. The process of claim 1 in which said separation of said insoluble impurities from said first slurry of dibasic calcium hypochlorite crystals is accomplished by elutriation, sedimentation, air flotation, hydraulic classification or hydrocycloning.

3. The process of claim 2 in which said insoluble impurities include fine crystals of dibasic calcium hypochlorite and said fine crystals are reacted with chlorine to form a slurry of insoluble impurities in a calcium hypochlorite solution.

4. The process of claim 2 in which said lime slurry fed to said first crystallizer contains from about 70 to about 90 percent of the total amount of lime employed in said process.

5. The process of claim 3 in which said dibasic calcium hypochlorite crystals have sizes in the range of from about 100 to about 1000 microns.

6. The process of claim 5 in which said separation method is elutriation.

7. The process of claim 3 in which said insoluble impurities are separated from said calcium hypochlorite solution.

8. The process of claim 6 in which said calcium hypochlorite solution is employed as the elutriant.

9. The process of claim 5 in which the total alkalinity of said second slurry of dibasic calcium hypochlorite crystals is maintained at from about 18 to about 22 percent.

* * * * *